United States Patent
Shen (10) Patent No.: US 7,457,922 B2
(45) Date of Patent: Nov. 25, 2008

(54) CACHE LINE PLACEMENT PREDICTION FOR MULTIPROCESSOR NON-UNIFORM CACHE ARCHITECTURE SYSTEMS

(75) Inventor: Xiaowei Shen, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 10/993,784

(22) Filed: Nov. 20, 2004

(65) Prior Publication Data

US 2006/0112228 A1  May 25, 2006

(51) Int. Cl.
*G06F 12/00* (2006.01)
(52) U.S. Cl. .............. 711/137; 711/129; 711/130; 711/133
(58) Field of Classification Search .......... 711/129, 711/130, 133, 137
See application file for complete search history.

(56) References Cited

U.S. PATENT DOCUMENTS

| | | | |
|---|---|---|---|
| 4,031,525 A * | 6/1977 | Volz et al. ............ 365/133 |
| 4,755,842 A * | 7/1988 | Barclay et al. .......... 396/285 |
| 5,727,150 A * | 3/1998 | Laudon et al. .......... 709/215 |
| 5,802,563 A | 9/1998 | Hagersten et al. |
| 5,806,086 A | 9/1998 | Kimmel et al. |
| 5,893,922 A | 4/1999 | Baylor et al. |
| 5,969,947 A * | 10/1999 | Johnson et al. .......... 361/704 |
| 6,108,764 A | 8/2000 | Baumgartner et al. |
| 6,266,742 B1 | 7/2001 | Challenger et al. |
| 6,275,907 B1 | 8/2001 | Baumgartner et al. |
| 6,347,362 B1 * | 2/2002 | Schoinas et al. .......... 711/147 |
| 6,449,651 B1 * | 9/2002 | Dorfman et al. .......... 709/229 |
| 6,633,959 B2 | 10/2003 | Arimillie et al. |
| 6,633,960 B1 | 10/2003 | Kessler et al. |
| 6,871,219 B2 * | 3/2005 | Noordergraaf et al. ....... 709/214 |
| 2002/0049824 A1 | 4/2002 | Wilson et al. |
| 2004/0179016 A1 * | 9/2004 | Kiser .................. 345/531 |
| 2005/0132140 A1 * | 6/2005 | Burger et al. ............ 711/128 |
| 2006/0064755 A1 * | 3/2006 | Azadet et al. ............ 726/24 |

FOREIGN PATENT DOCUMENTS

JP   01092801   6/2001

OTHER PUBLICATIONS

Kim et al., Nonuniform Cache Architectures for Wire-Delay Dominated On-chip Caches, 2003, pp. 99-107.*

Changkyu Kim, an Adaptive, Non-Uniform Cache Structure for Wire-Delay Dominated On-Chip Caches, Proceedings of the 10th International Conference on Architectural Support for Programming Languages and Operating Systems (ASPLOS), pp. 1-12.

* cited by examiner

*Primary Examiner*—Reginald G. Bragdon
*Assistant Examiner*—Aracelis Ruiz
(74) *Attorney, Agent, or Firm*—F. Chau & Associates, LLC (57) ABSTRACT

In a multiprocessor non-uniform cache architecture system, multiple CPU cores shares one non-uniform cache that can be partitioned into multiple cache portions with varying access latencies. A placement prediction mechanism predicts whether a cache line should remain in a cache portion or migrate to another cache portion. The prediction mechanism maintains one or more prediction counters for each cache line. A prediction counter can be incremented or decremented by a constant or a variable determined by some runtime information, or set to its maximum or minimum value. An effective placement prediction mechanism can reduce average access latencies without causing cache thrashing among cache portions.

13 Claims, 9 Drawing Sheets

| | Initial value | Local access | Remote access | Predict cache line move |
|---|---|---|---|---|
| Scheme-1 | 0 (or $2^n$-1) | Decrement by 1 or k>>1 | Increment by 1 | If counter reaches $2^n$-1 |
| Scheme-2 | 0 | Set to 0 | Increment by 1 | If counter reaches $2^n$-1 |
| Scheme-3 | 0 | Multiplicative decrement by right-shift | Increment by 1 | If counter reaches $2^n$-1 |

Figure 5

|  | Local counter update for a local access | Remote counter update for a local access | Local counter update for a remote access | Remote counter update for a remote access |
|---|---|---|---|---|
| Example 1 | Increment by 2 | Decrement by 1 | Decrement by 1 | Increment by 1 |
| Example 2 | Increment by 2 | Decrement by 2 | Decrement by 1 | Increment by 1 |
| Example 3 | Set to $2^n-1$ | Decrement by 1 | Decrement by 1 | Increment by 1 |
| Example 4 | Set to $2^n-1$ | Set to 0 | Decrement by 1 | Increment by 1 |
| Example 5 | Multiplicative increment | Decrement by 1 | Decrement by 1 | Increment by 1 |
| Example 6 | Multiplicative increment | Multiplicative decrement | Decrement by 1 | Increment by 1 |

| Prediction | Condition |
|---|---|
| Remain in cache portion 0 | counter[portion 1] − counter[portion 0] < threshold<br>counter[portion 2] − counter[portion 0] < threshold<br>counter[portion 3] − counter[portion 0] < threshold |
| Migrate from portion 0 to portion 1 | counter[portion 1] >= counter[portion 2]<br>counter[portion 1] >= counter[portion 3]<br>counter[portion 1] − counter[portion 0] >= threshold |
| Migrate from portion 0 to portion 2 | counter[portion 2] > counter[portion 1]<br>counter[portion 2] >= counter[portion 3]<br>counter[portion 2] − counter[portion 0] >= threshold |
| Migrate from portion 0 to portion 3 | counter[portion 3] > counter[portion 1]<br>counter[portion 3] > counter[portion 2]<br>counter[portion 3] − counter[portion 0] >= threshold |

Figure 8

| x-counter | y-counter | Prediction |
|---|---|---|
| > high-threshold (e.g. 3*2^{n-2}) | > high-threshold (e.g. 3*2^{n-2}) | Remain in cache portion 0 |
| < low-threshold (e.g. 2^{n-2}) | > high-threshold (e.g. 3*2^{n-2}) | Migrate to cache portion 1 |
| < low-threshold (e.g. 3*2^{n-2}) | < low-threshold (e.g. 2^{n-2}) | Migrate to cache portion 2 |
| > high-threshold (e.g. 2^{n-2}) | < low-threshold (e.g. 2^{n-2}) | Migrate to cache portion 3 |

Figure 9

CACHE LINE PLACEMENT PREDICTION FOR MULTIPROCESSOR NON-UNIFORM CACHE ARCHITECTURE SYSTEMS

GOVERNMENT RIGHTS STATEMENT

This invention was made with Government support under Contract No.: (NBCHC020056) awarded by the Defense Advanced Research Projects Agency (DARPA). The Government has certain rights in this invention.

BACKGROUND OF THE INVENTION

1. Field of the Invention

The present invention relates to multiprocessor non-uniform cache architecture systems, and, more particularly, cache line placement prediction for multiprocessor non-uniform cache architecture systems.

2. Description of the Related Art

As semiconductor technology advances, growing wire delays are becoming a dominant factor in overall cache access latencies. A Non-Uniform Cache Architecture ("NUCA") system comprises multiple cache portions, wherein different cache portions have different access latencies due to different distances from an accessing processor. The time required to access a data item from a non-uniform cache largely depends on where the data item is located in the non-uniform cache, instead of the actual tine used to retrieve the data item from a data array.

Designing a NUCA system require numerous architectural issues to be considered. For example, questions for consideration may include: (1) How to map memory addresses to different cache portions; (2) How to connect cache portions with each other; (3) How to search a memory address in a non-uniform cache; (4) Where to place a cache line when it is brought into a non-uniform cache from the memory; and (5) How to ensure coherence if data of a cache line can be replicated in multiple cache portions. Decisions on these and other architectural issues may have a profound impact on the overall performance and complexity of the NUCA system.

It is generally desirable to allow a cache line to migrate from one cache portion to another to reduce cache access latencies. For example, in a uni-processor NUCA system, a promotion scheme may allow a cache line to gradually migrate toward the processor each time the cache line is accessed (see "An Adaptive, Non-Uniform Cache Structure for Wire-Delay Dominated On-Chip Caches", in Proceedings of the 10th International Conference on Architectural Support for Programming Languages and Operating Systems, by C. Kim, D. Burger and S. Keckler). It should be understood that, in a multiprocessor NUCA system, the promotion scheme can often cause a cache line to "ping-pong" among multiple cache portions if the cache line is accessed by multiple processors.

Figure 1:
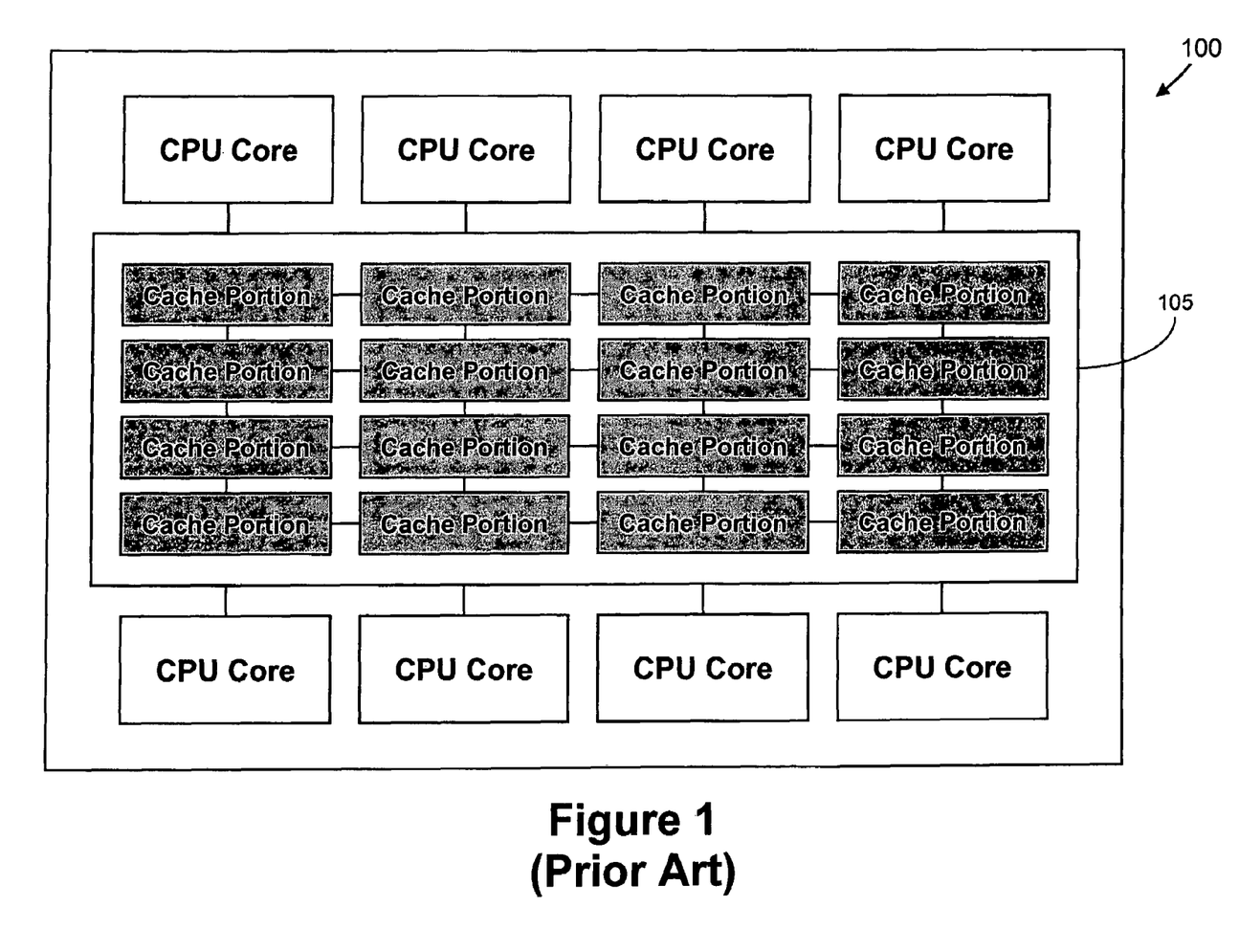
FIG. 1 depicts an exemplary multiprocessor NUCA system wherein multiple CPU cores share a non-uniform cache that is partitioned into multiple cache portions.

Referring now to FIG. 1, an exemplary multiprocessor NUCA system 100 includes a number of central processing unit ("CPU") cores. As shown, the CPU cores share one non-uniform cache 105 that is partitioned into multiple cache portions. Given a CPU core, different cache portions with varying physical distances from the CPU core may have different cache access latencies because of varying communication delays. Although not so labeled in FIG. 1, each CPU core may have one or more local cache portions and one or more remote cache portions. A local cache portion refers to a cache portion that is physically closer to the corresponding CPU core than the corresponding remote cache portions. It should be understood that directory information (not shown), typically including cache tags, coherence states and LRU bits, can be maintained in a centralized location or distributed with corresponding cache portions.

Figure 2:
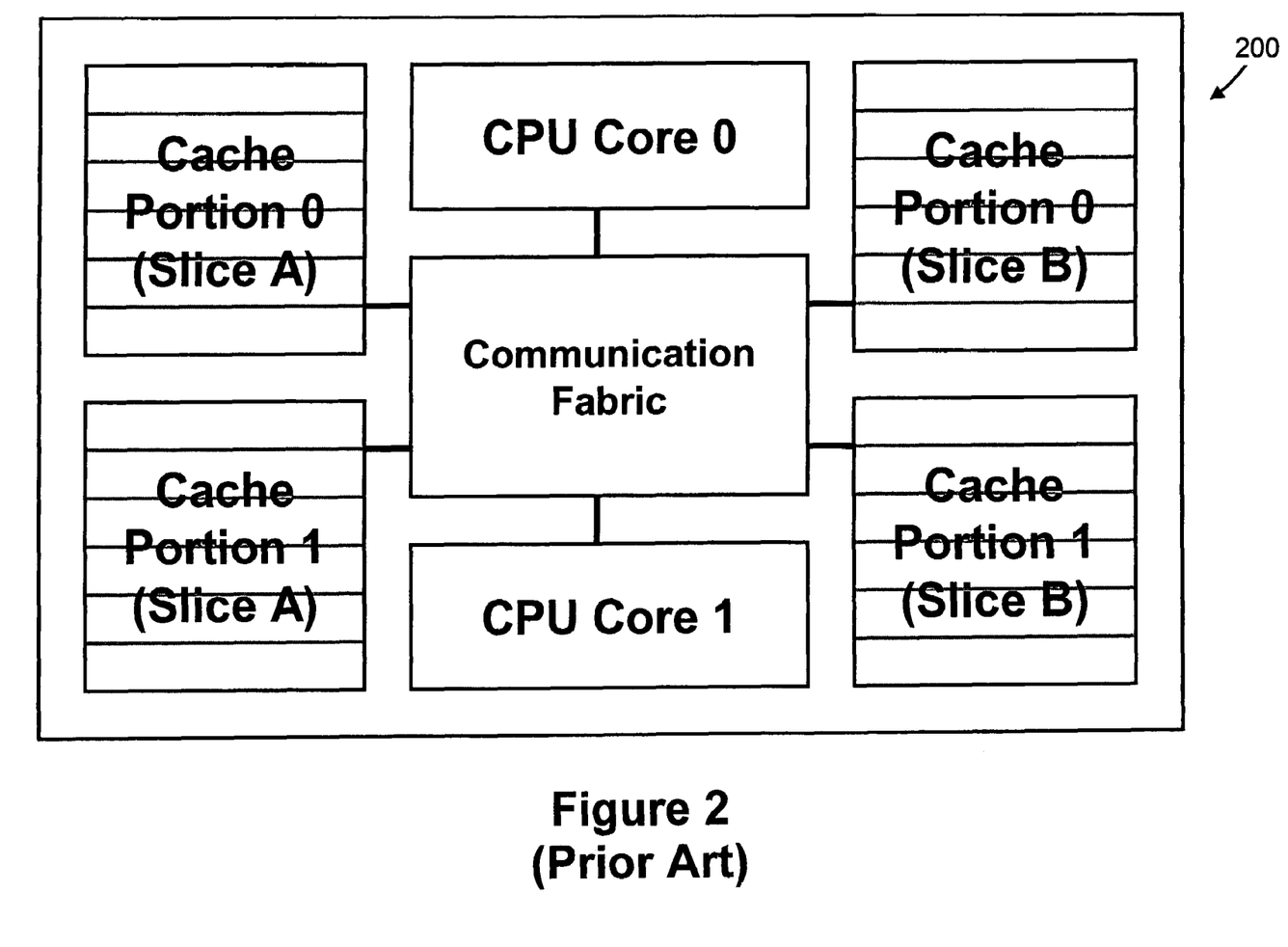
FIG. 2 depicts an exemplary multiprocessor NUCA system that comprises two CPU cores and two cache portions.

Referring now to FIG. 2, an exemplary multiprocessor NUCA system 200 is shown. The system 200 comprises two CPU cores, CPU core 0 and CPU core 1, sharing one non-uniform cache. The non-uniform cache comprises two cache portions, cache portion 0 and cache portion 1, wherein each cache portion can be further partitioned into two cache slices. From the perspective of CPU 0, cache portion 0 is local and cache portion 1 is remote because cache portion 0 is physically closer to CPU 0 than cache portion 1; likewise, from the perspective of CPU 1, cache portion 1 is local and cache portion 0 is remote because cache portion 1 is physically closer to CPU 1 than cache portion 0. A communication fabric allows a CPU core to access either of the two cache portions, and can be used to migrate data from a cache portion to another if necessary.

Figure 3:
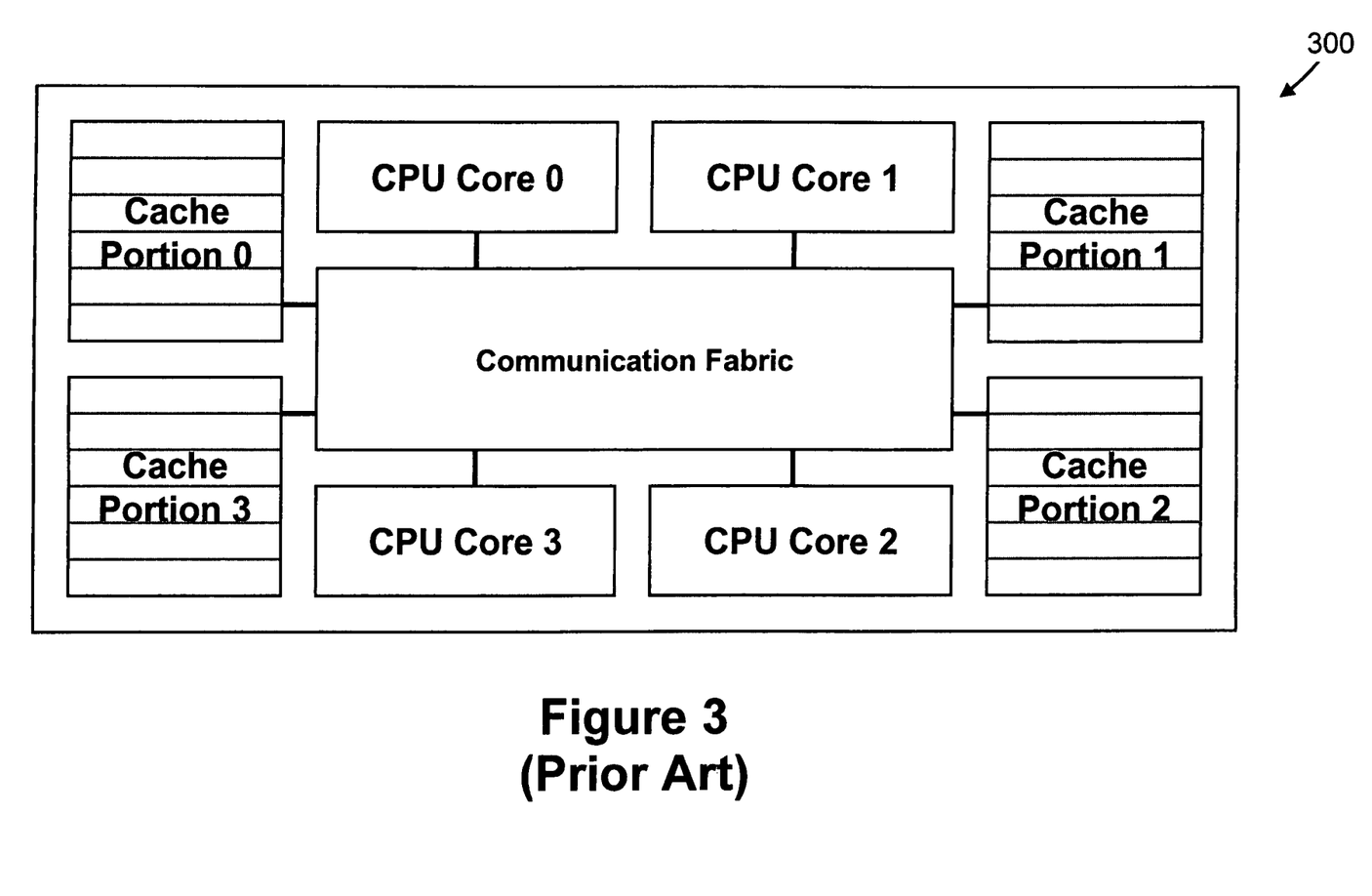
FIG. 3 depicts an exemplary multiprocessor NUCA system that comprises four CPU cores and four cache portions.

Referring now to FIG. 3, another exemplary multiprocessor NUCA system 300 is shown. The system comprises four CPU cores, CPU core 0, CPU core 1, CPU core 2 and CPU core 3, sharing one non-uniform cache. The non-uniform cache comprises four cache portions, cache portion 0, cache portion 1, cache portion 2 and cache portion 3, which are local to CPU core 0, CPU core 1, CPU core 2 and CPU core 3, respectively. The CPU cores and cache portions can communicate with each other via a communication fabric.

SUMMARY OF THE INVENTION

In one aspect of the present invention, a system for cache line placement prediction for a multiprocessor non-uniform cache architecture is provided. The system includes a plurality of central processing unit (CPU) cores comprising a local CPU core and a remote CPU core; a non-uniform cache comprising a plurality of cache portions, the plurality of cache portions comprising a local cache portion and a remote cache portion; and a cache line placement prediction mechanism for predicting whether a cache line in the local cache portion one of (a) remains in the local cache portion, and (b) migrates from the local cache portion to the remote cache portion; wherein each of the plurality of CPU cores can access data from each of the plurality of cache portions; wherein the local CPU core has lower cache access cost to the local cache portion than to the remote cache portion; and wherein the remote CPU core has lower cache access cost to the remote cache portion than to the local cache portion.

In another embodiment of the present invention, a method of cache line placement prediction in a multiprocessor non-uniform cache architecture is provided. The multiprocessor non-uniform cache architecture comprises a first CPU core and a second CPU core. The first CPU core and the second CPU core share a non-uniform cache. The non-uniform cache comprises a first cache portion and a second cache portion. The method includes the steps of (1) accessing a cache line in the first cache portion from at least one of the first CPU core and the second CPU core; (2) updating a prediction state associated with the cache line, wherein the prediction state comprises one or more prediction counters; (3) generating a prediction result indicating one of (a) the cache line remains in the first cache portion, and (b) the cache line migrates from the first cache portion to the second cache portion; and (4) migrating the cache line from the first cache portion to the second cache portion, if the prediction result indicates that the cache line migrates from the first cache portion to the second cache portion.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims. It should be understood that the systems and methods described herein may be implemented in various forms of hardware, software, firmware, or a combination thereof.

The steps of the method may be implemented as instructions on a machine-readable medium for execution by a processor.

A miss occurs, if requested data is not found in the non-uniform cache. The CPU core needs to bring the data to the non-uniform cache from another cache or the memory. The data can be placed in a local or remote cache portion.

A local hit occurs, if requested data is found in a local cache portion. The CPU core can access data from the local cache portion with short access latency.

A remote hit occurs, if requested data is found in a remote cache portion. The CPU core can retrieve the data directly from the remote cache portion.

It should be appreciated that, in the case of a remote hit, if the CPU core needs to access the data multiple times, it may become desirable to migrate the data from the remote cache portion to a cache portion that is closer to the accessing CPU core, such as the local cache portion.

A cache line placement (i.e., migration) prediction mechanism can be employed to predict when a cache line should be migrated from one cache portion to another. Given a cache line, the cache line migration prediction mechanism maintains some prediction state indicating the desired cache portion of the cache line. Intuitively, a cache line accessed by multiple CPU cores is like an object pulled by multiple forces. The prediction state represents the overall or accumulated force exerted on the object, and therefore determines whether and to which direction the object should move.

The prediction state generally comprises one or more prediction counters, which are also referred to as migration counters ("M-counters"). The terms "prediction counters" and "migration counters" are used interchangeably in the present invention. For example, the cache line migration prediction mechanism can maintain an M-counter for a remote cache portion to indicate the overall accesses from all CPU cores that may drive the cache line to the remote cache portion. The M-counter can be updated accordingly each time the cache line is accessed.

The cache line migration prediction mechanism provides the prediction state as heuristic information to a cache controller that performs the actual cache line migration operation. With an effective cache line migration prediction mechanism, the cache controller can promptly move data close to a CPU core that is likely to generate many accesses to the cache line, while avoiding moving data back and forth among different cache portions if the cache line is accessed by multiple CPU cores.

It should be understood that, when the cache line migration prediction mechanism predicts that a cache line should be migrated to a remote cache portion, the migration may not happen immediately. For example, the cache controller may perform actual migration when the cache line is accessed again by the remote cache portion. In an alternate embodiment, cache line migrations may be performed in a burst fashion. For example, the cache controller can check a cache portion (or part of a cache portion) periodically, and migrate multiple cache lines together to reduce overall migration cost.

When a cache line is migrated from a source cache portion to a target cache portion, a victim cache line in the target cache portion may need to be replaced. This victim cache line can be flushed from the target cache portion. Alternatively, the victim cache line can be swapped with the migrated cache line from the source cache portion. The LRU replacement algorithm typically employed by the cache controller can be properly enhanced to give preference to a cache line whose prediction state indicates that the cache line is likely to be accessed more frequently by one or more CPU cores close to the source cache portion.

The method by which prediction counters are updated determines when cache lines migrate in a non-uniform cache. An M-counter can be incremented or decremented when the cache line is accessed. Further, the value by which an M-counter is incremented or decremented can depend on any of a variety of factors, including the cost metrics of accessing different cache portions and moving a cache line from one cache portion to another. Although not so limited, an M-counter can be updated in one of the following ways:

Increment by a constant;
Decrement by a constant;
Increment by a variable determined by some runtime information;
Decrement by a variable determined by some runtime information.
Set to the maximum value;
Set to the minimum value;
Multiplicative increment such as left-shift;
Multiplicative decrement such as right-shift;

Illustrative Embodiment 1

Figure 4:
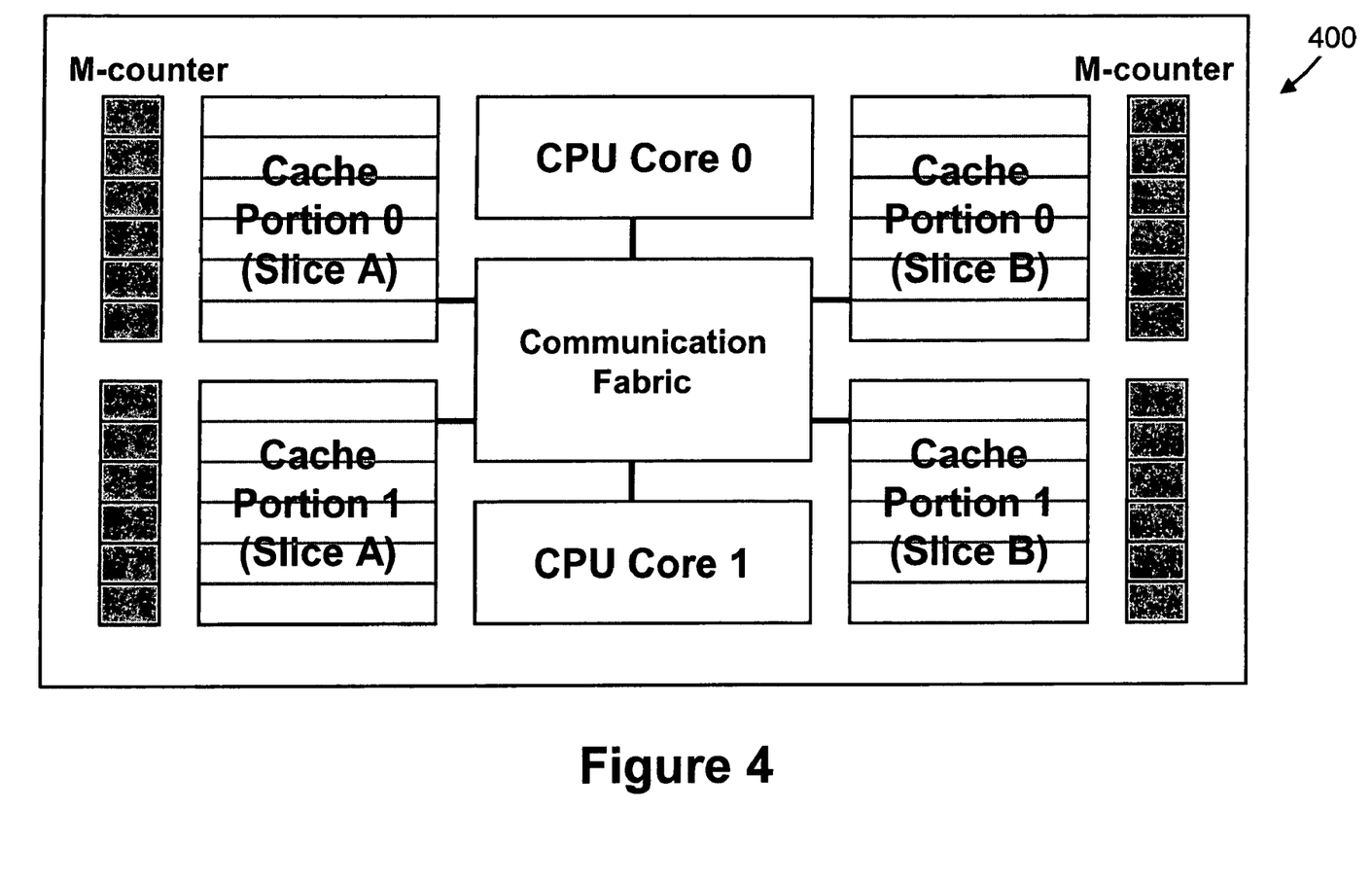
FIG. 4 depicts a multiprocessor NUCA system in which each cache line maintains a prediction counter for migration prediction, in accordance with one illustrative embodiment of the present invention.

Referring now to FIG. 4, consider a multiprocessor NUCA system 400 that comprises two CPU cores sharing one non-uniform cache. The non-uniform cache comprises a cache portion 0 and a cache portion 1, which are local cache portions for CPU core 0 and CPU core 1, respectively. A communication fabric can be used to migrate a cache line from one cache portion to another.

In a first illustrative embodiment of the present invention, as shown in FIG. 4, each cache line maintains an M-counter that is updated each time the cache line is accessed by a CPU core. Different counter update schemes can be employed.

Figure 5:
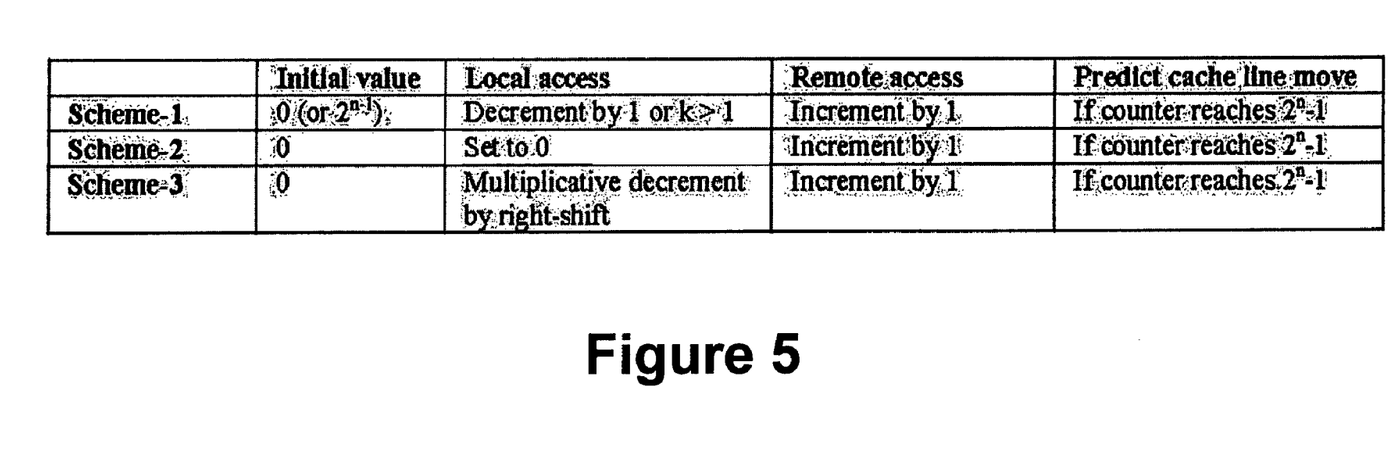
FIG. 5 shows exemplary prediction counter update schemes, in accordance with one illustrative embodiment of the present invention.

Referring now to FIG. 5, three exemplary counter update schemes are shown, including scheme-1, scheme-2 and scheme-3.

In scheme-1, an M-counter reflects the difference between the number of local accesses and the number of remote accesses since the cache line is cached in the cache portion. An n-bit M-counter can hold a value from 0 to $2^n-1$. The M-counter saturates when it reaches its maximum ($2^n-1$) or minimum (0). When a cache line is brought to a cache portion, the corresponding M-counter is set to some initial value (0 or $2^{n-1}$). Each time the cache line is accessed by the local CPU core, the corresponding M-counter is decremented by 1 (or some positive value). Each time the cache line is accessed by the remote CPU core, the corresponding M-counter is incremented by 1. If the M-counter reaches the maximum ($2^n-1$), the prediction mechanism predicts that the cache line should be moved to the remote cache portion.

As previously noted, an M-counter can be incremented and decremented by any of a variety of values depending on the particular implementation. For example, an M-counter can be decremented by 2 for a local access, and incremented by 1 for a remote access. This effectively gives local CPU accesses more weight in cache placement, which effectively makes a cache line "sticky" to its local cache portion. Appropriate M-counter update policies can reduce unnecessary cache thrashing among cache portions.

In scheme-2, an M-counter records the number of remote accesses since the last local access. An n-bit M-counter can hold a value from 0 to $2^n-1$. The M-counter saturates when it reaches its maximum ($2^n-1$) or minimum (0). When a cache line is brought to a cache portion, the corresponding M-counter is set to 0. When the cache line is accessed by the local CPU core, the M-counter is set to 0. When the cache line is accessed by the remote CPU core, the M-counter is incremented by 1. If the counter reaches the maximum ($2^{n-1}$), the prediction mechanism predicts that the cache line should be moved to the remote cache portion. This effectively prevents a cache line from moving from the local cache portion to the remote cache portion unless the cache line has been accessed by the remote CPU core a number of times consecutively without being accessed by the local CPU core.

In scheme-3, an M-counter is updated via multiplicative decrement and additive increment. An n-bit M-counter can hold a value from 0 to $2^n-1$. The M-counter saturates when it reaches its maximum ($2^n-1$) or minimum (0). When a cache line is brought to a cache portion, the corresponding M-counter is set to 0. When the cache line is accessed by the local CPU core, the M-counter is shifted right by 1 bit, which effectively decrements its value by half. When the cache line is accessed by the remote CPU core, the M-counter is incremented by 1. If the M-counter reaches the maximum ($2^n-1$), the prediction mechanism predicts that the cache line should be moved to the remote cache portion. The prediction mechanism avoids detrimental cache thrashing, and allows a cache line to be moved closer to the CPU that generates most of the accesses to the cache line.

In each of three schemes described above, the prediction counter is decremented for a local CPU core access and incremented for a remote CPU core access, and the prediction mechanism predicts a cache line migration when the prediction counter reaches the maximum. In an alternate embodiment, the prediction counter is incremented for a local access and decremented for a remote access, and the prediction mechanism predicts a cache line migration when the prediction counter reaches the minimum.

Additionally, in each of the three schemes described above, a predefined migration threshold is used to determine if a cache line is frequently accessed by a remote CPU core and thus needs to be migrated. Choosing an appropriate migration threshold is critical: a high migration threshold may make a cache line too difficult to migrate, causing excessive remote accesses; while a low migration threshold may make a cache line too easy to migrate, causing unnecessary cache thrashing.

It should be appreciated that the cache line migration prediction mechanism described above can be enhanced with an adaptive migration threshold that can be dynamically adjusted for varying access patterns. For example, the prediction mechanism can have multiple predefined thresholds. Each cache line maintains a threshold flag to indicate which threshold should be used. When a cache line is brought into a cache portion, the corresponding threshold flag is set according to any of a variety of factors, including access pattern hints from the software, and usage of the cache line since the last time it was migrated from this cache portion.

It should be appreciated that the cache line migration prediction mechanism can use multiple prediction counters as the prediction state of a cache line. For example, each cache line can maintain a local prediction counter and a remote prediction counter, which indicate the overall impact of recent accesses for the cache line to be placed in the local and remote cache portions respectively. An n-bit local prediction counter can hold a value from 0 to $2^n-1$, and an m-bit remote prediction counter can hold a value from 0 to $2^m-1$. Prediction counters saturate when they reach their maximum ($2^n-1$ and $2^m-1$, respectively) or minimum (0). When a cache line is brought to a cache portion, both the local and remote prediction counters are set to 0. When the cache line is accessed by the local CPU core, the local prediction counter is incremented while the remote prediction counter is decremented. When the cache line is accessed by the remote CPU core, the remote prediction counter is incremented while the local prediction counter is decremented. The prediction mechanism predicts that the cache line should be moved to the remote cache portion, if the difference between the remote and local counters is above some predefined migration threshold (e.g., $2^{m-1}$).

Figure 6:
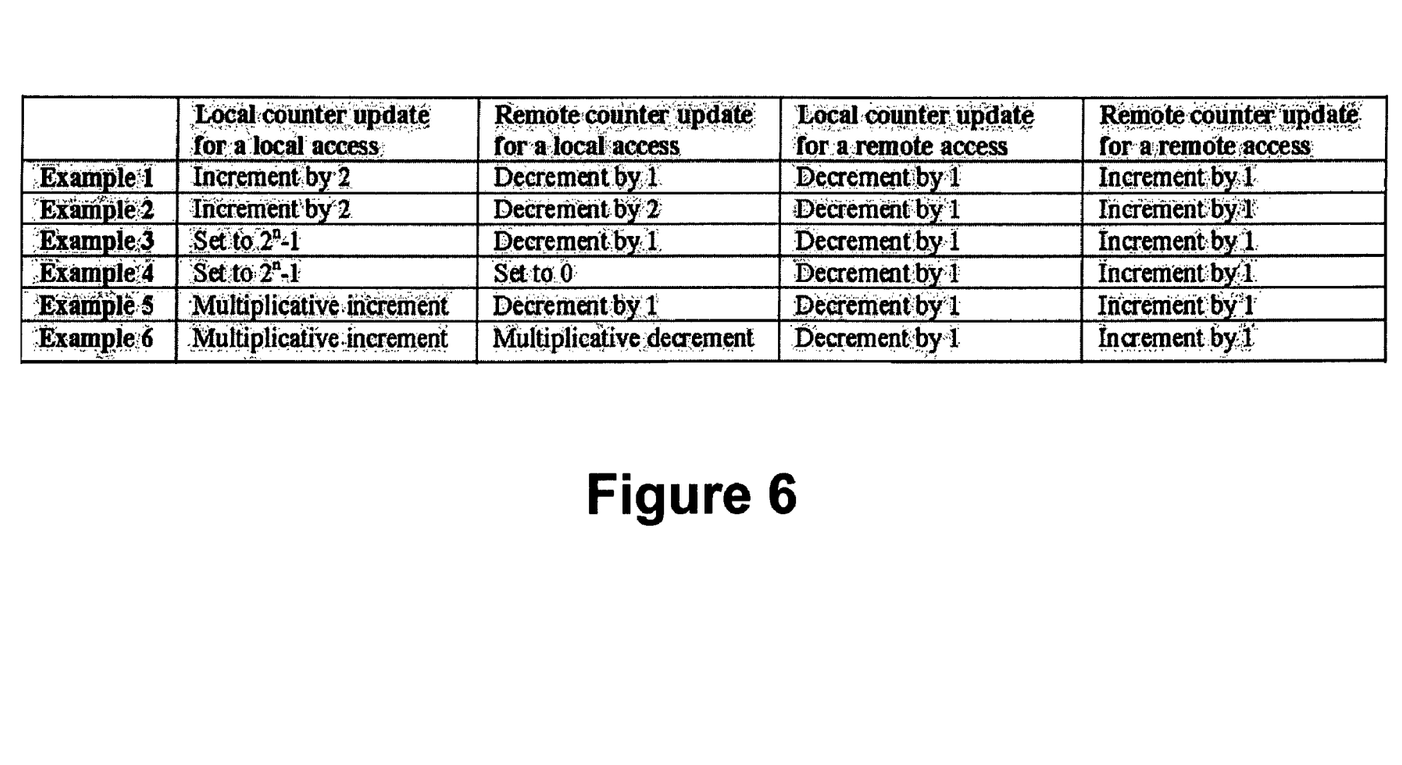
FIG. 6 shows exemplary prediction counter update schemes, for a system that comprises a local counter and a remote counter for migration prediction, in accordance with one illustrative embodiment of the present invention.

Different prediction counter update schemes can be employed for local and remote prediction counters. Further, a prediction counter can be incremented with a value that is different from the value used when the prediction counter is decremented. Although not so limited, FIG. 6 presents several exemplary schemes for local and remote prediction counter updates.

Illustrative Embodiment 2

The first illustrative embodiment described above assumes that two CPU cores share a non-uniform cache that comprises two cache portions. The first embodiment can be generalized to a multiprocessor NUCA system that includes an arbitrary number of CPU cores that share a non-uniform cache, wherein the non-uniform cache comprises an arbitrary number of cache portions. It should be understood that the number of CPU cores can be different from the number of cache portions.

Figure 7:
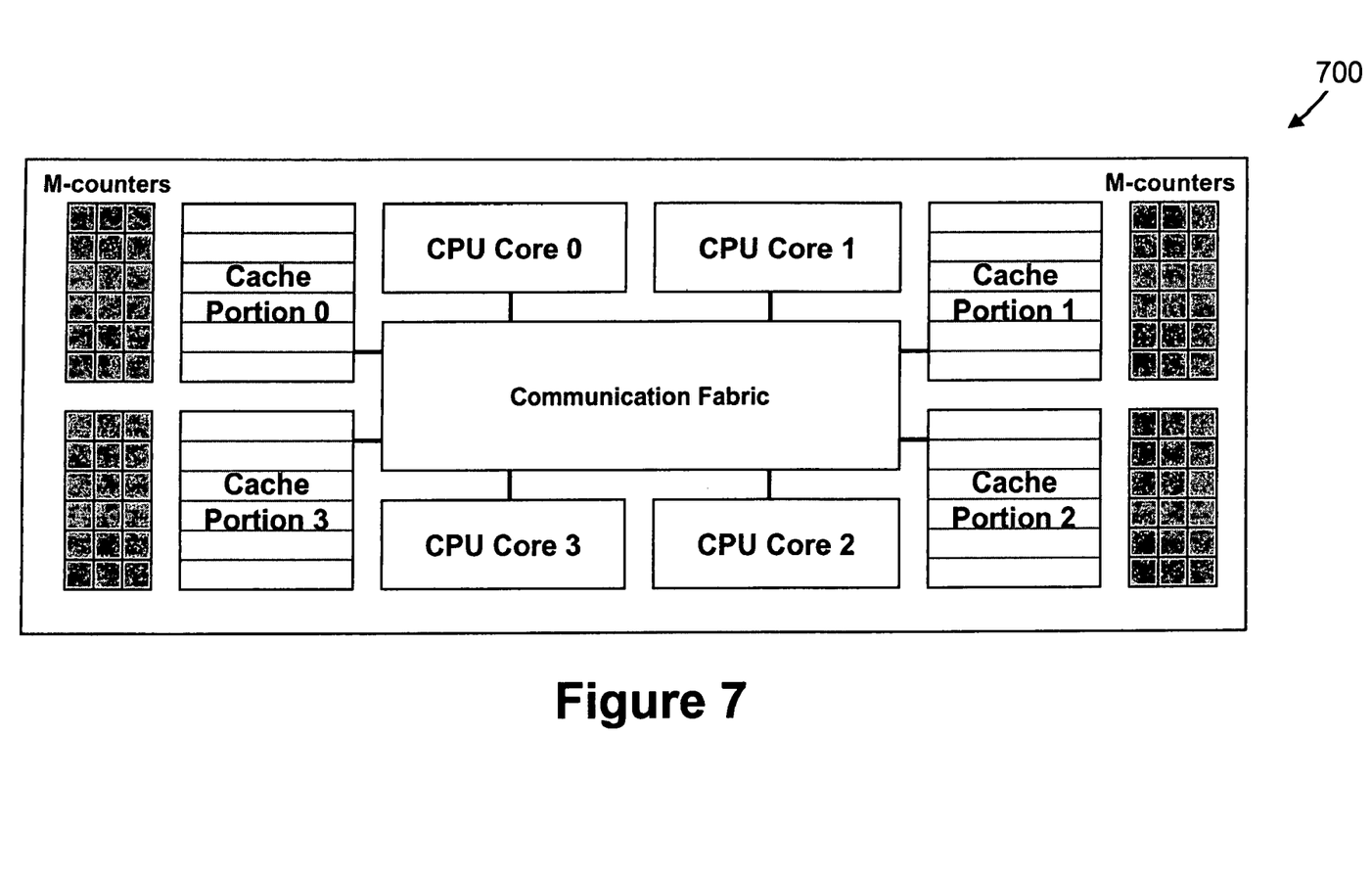
FIG. 7 depicts a multiprocessor NUCA system in which each cache line maintains three prediction counters for migration prediction, in accordance with one illustrative embodiment of the present invention.

Referring now to FIG. 7, a multiprocessor NUCA system 700 that contains four CPU cores sharing one non-uniform cache is shown. The non-uniform cache comprises a cache portion 0, a cache portion 1, a cache portion 2 and a cache portion 3, which are local for CPU core 0, CPU core 1, CPU core 2 and CPU core 3, respectively. A communication fabric can be used to migrate a cache line from one cache portion to another.

In a second illustrative embodiment of the present invention, each cache line maintains three prediction counters, corresponding to the three remote cache portions, respectively. A prediction counter indicates the accumulated effect of accesses that intend to migrate the cache line to the corresponding remote cache portion. When a cache line is brought to a cache portion, the corresponding prediction counters are initialized appropriately. Each time the cache line is accessed by the local CPU core, the prediction counters are updated accordingly so that the cache line is less likely to migrate to a remote cache portion. Each time the cache line is accessed by a remote CPU core, the prediction counters are updated accordingly so that the cache line is more likely to migrate to the accessing remote CPU core.

It should be appreciated that alternative prediction counter architectures can be employed to predict cache line migrations. For example, a cache line can maintain a set of prediction counters, wherein each prediction counter corresponds to a cache portion. A prediction counter indicates the accumulated impact of accesses that intend to place the cache line in the corresponding cache portion. When a cache line is accessed, all its prediction counters are updated to indicate that the cache line intends to move toward a particular direction. Different prediction counters can be incremented or decremented by different values, reflecting various design considerations. The prediction mechanism can determine whether a cache line should be migrated from one portion to another based on the contents of all its prediction counters.

For example, referring again to FIG. 3, assume that the access latency of CPU core 0 to the local cache portion 0 is 20 cycles, and the access latencies of CPU core 0 to the remote cache portions 1, 2 and 3 are 30 cycles, 40 cycles and 30 cycles, respectively. Consider a cache line in the cache portion 0; The cache line has four prediction counters (not shown) that correspond to the four cache portions. When the cache line is accessed by the CPU core 0, the prediction counter corresponding to cache portion 0 is incremented by 2, and the prediction counters corresponding to cache portions 1, 2 and 3 are decremented by 1, 2 and 1, respectively. As a result, the cache line is "sticky" to the local cache portion 0. Further, the cache line is less likely to move to the far remote cache portion 2, compared with the remote cache portions 1 and 3.

Figure 8:
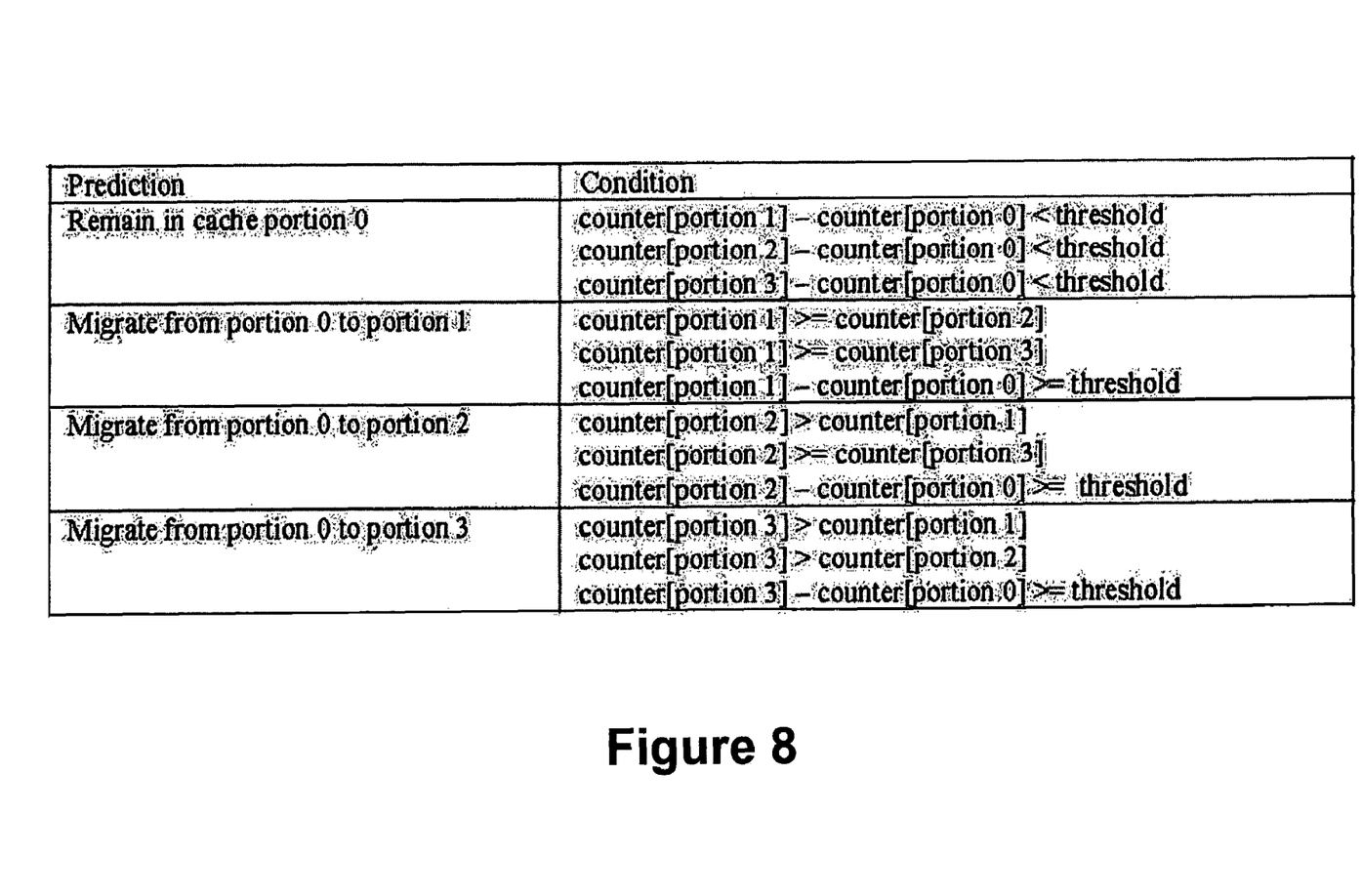
FIG. 8 illustrates exemplary prediction conditions under which a cache line is predicted to remain in a cache portion or move to another, in accordance with one illustrative embodiment of the present invention.

Referring now to FIG. 8, exemplary prediction conditions are shown under which the prediction mechanism predicts whether a cache line in cache portion 0 should remain in cache portion 0 or migrate to another cache portion. For example, the prediction mechanism can predict that a cache line should be moved from the local cache portion 0 to a remote cache portion 1 if the prediction counter for cache portion 1 is above the prediction counters for cache portions 2 and 3, and the difference between the prediction counter for cache portion 1 and the prediction counter for cache portion 0 is above some predefined threshold.

Illustrative Embodiment 3

A potential drawback of the second illustrative embodiment described above is that the storage used for prediction counters can be large when the non-uniform cache comprises many cache portions. In a third illustrative embodiment of the present invention, a 2-dimension prediction scheme is employed to reduce the storage overhead of prediction counters. A cache line maintains two prediction counters, an x-counter and a y-counter, indicating 2-dimension coordinates (in a cache structure) of the cache portion in which the cache line is determined to be placed. When a cache line is brought into a cache portion, the x-counter and y-counter are set to appropriate initial values that correspond to the cache portion. Each time the cache line is accessed by a CPU core that is close to the cache portion, the x-counter and y-counter are updated accordingly so that the cache line is more likely to remain in the cache portion. Each time the cache line is accessed by a CPU core that is far from the cache portion, the x-counter and y-counter are updated accordingly so that the cache line is more likely to move closer to the accessing CPU core. The prediction mechanism predicts whether the cache line should be migrated to another cache portion based on the x-counter and y-counter.

Referring again to FIG. 3, consider a multiprocessor NUCA system that includes four CPU cores sharing a non-uniform cache that comprises four cache portions. Let both the x-counter and y-counter (not shown) be n-bit prediction counters that can hold values from 0 to $2^n-1$. When a cache line is brought to the cache portion 0, the prediction counters are initialized to proper values (e.g., $2^n-1$). When the cache line is accessed by a CPU core, the x-counter and y-counter are updated accordingly. When a prediction counter is updated, it can be incremented or decremented by a constant or a variable, or set to the maximum ($2^n-1$) or minimum (0) value. The prediction counters can be updated as follows:

If the cache line is accessed by CPU core 0, both the x-counter and the y-counter are incremented;
If the cache line is accessed by CPU core 1, the x-counter is decremented, while the y-counter is incremented;
If the cache line is accessed by CPU core 2, both the x-counter and the y-counter are decremented;
If the cache line is accessed by CPU core 3, the x-counter is incremented, while the y-counter is decremented.

Figure 9:
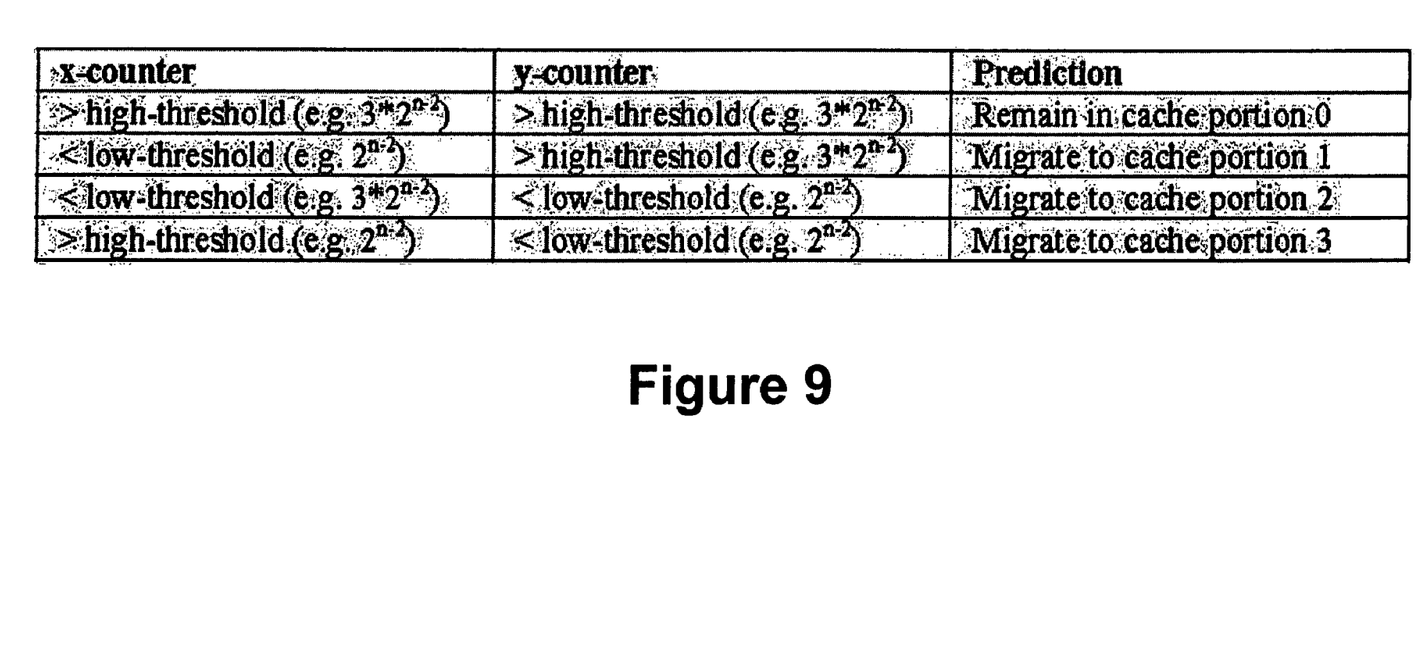
FIG. 9 illustrates exemplary prediction conditions under which a cache line is predicted to remain in a cache portion or move to another in a 2-dimension prediction scheme, in accordance with one illustrative embodiment of the present invention.

Referring now to FIG. 9, exemplary prediction conditions are shown under which the cache line is predicted to remain in cache portion 0 or migrate to another cache portion. It should be noted that the prediction mechanism uses two predefined thresholds in its prediction: a high-threshold that is close to the maximum ($2^n-1$), and a low threshold that is close to the minimum (0).

Remarks

It should be understood to those skilled in the art that multiple cache portions can be grouped into a cache portion group based on proximity. This allows a prediction counter to be maintained for a group of cache portions that are physically close to each other. The prediction mechanism predicts whether a cache line should be moved from one cache portion group to another. If necessary, an intra-group prediction mechanism can be further employed to predict whether a cache should be moved from one cache portion to another in the same cache portion group.

It should also be understood to those skilled in the art that, instead of maintaining prediction states for individual cache lines, prediction states can be maintained at a coarser granularity. For example, a prediction counter can be maintained for multiple cache lines defined by some hash function. Furthermore, prediction counters can be maintained just for recently accessed cache lines to reduce the implementation cost.

It should further be understood to those skilled in the art that the cache line placement prediction mechanism can be augmented to predict when a cache line is brought into a non-uniform cache from another cache or the memory, in which cache portion the cache line should be placed. For example, the cache line can be placed in a cache portion that is close to the accessing CPU core.

Additionally, it should be understood to those skilled in the art that the cache line placement prediction mechanism can be augmented to predict when a cache line should be replicated in different cache portions of a non-uniform cache to improve overall performance.

The particular embodiments disclosed above are illustrative only, as the invention may be modified and practiced in different but equivalent manners apparent to those skilled in the art having the benefit of the teachings herein. Furthermore, no limitations are intended to the details of design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for cache line placement prediction for a multiprocessor non-uniform cache architecture, comprising:
   a plurality of central processing unit (CPU) cores comprising at least first through third CPU cores;
   a non-uniform cache comprising a plurality of cache portions, the plurality of cache portions comprising at least first through third cache portions; and
   a cache line placement prediction mechanism for predicting whether a cache line in the first cache portion (a) remains in the first cache portion, (b) migrates from the first cache portion to the second cache portion, or (c) migrates from the first cache portion to the third cache portion;
   wherein each of the plurality of CPU cores can access data from each of the plurality of cache portions; and
   wherein the cache line placement prediction mechanism comprises a prediction state for the cache line, the prediction state comprising a x-counter and a y-counter, the x-counter and y-counter indicating two-dimensional coordinates of the non-uniform cache in which the cache line is predicted to be placed.

2. The system of claim 1, wherein a cache access cost is measured by at least one of cache access latency, communication latency, bandwidth consumption, and power consumption.

3. The system of claim 1, wherein when the cache line is accessed by one of the plurality of CPU cores, the x-counter and y-counter are updated to indicate that the cache line is more likely to move toward the one of the plurality of CPU cores.

4. The system of claim 3, wherein the cache line placement prediction mechanism predicts cache line migration based on the x-counter and the y-counter.

5. The system of claim 1, wherein the cache line placement prediction mechanism comprises a prediction state for the cache line, the prediction state comprising at least one prediction counter that is updated each time the cache line is accessed.

6. The system of claim 1, wherein the cache line placement prediction mechanism further predicts, when a cache line is brought into the non-uniform cache, in which of the plurality of cache portions the cache line is to be placed.

7. The system of claim 1, wherein the cache line placement prediction mechanism further predicts when data of a cache line is to be replicated in more than one cache portion.

8. The system of claim 1, wherein the cache line placement prediction mechanism further predicts whether the cache line in the first cache portion (d) migrates from the first cache portion to a fourth cache portion of the non-uniform cache.

9. A method of cache line placement prediction in a multiprocessor non-uniform cache architecture, wherein the multiprocessor non-uniform cache architecture comprises a first CPU core, a second CPU core and a third CPU core, the first through third CPU cores share a non-uniform cache, the non-uniform cache comprises a first cache portion, a second cache portion and a third cache portion, the method comprising:
   (1) accessing a cache line in the first cache portion from at least one of the first through third CPU cores;
   (2) updating a prediction state associated with the cache line, wherein the prediction state comprises two prediction counters;
   (3) generating a two-dimensional prediction result based on the prediction state indicating one of (a) the cache line remains in the first cache portion, (b) the cache line migrates from the first cache portion to the second cache portion and (c) the cache line migrates from the first cache portion to the third cache portion; and (4) migrating the cache line from the first cache portion according to the two-dimensional prediction result.

10. The method of claim 9, wherein cache access cost is measured by at least one of cache access latency, communication latency, bandwidth consumption, and power consumption.

11. The method of claim 9, wherein the steps of the method are implemented in hardware for execution by a processor.

12. The method of claim 9, wherein the steps of the method are implemented as instructions on a machine-readable medium for execution by a processor.

13. The method of claim 9, wherein the two-dimensional prediction result based on the prediction state further indicates whether (d) the cache line migrates from the first cache portion to a fourth cache portion of the non-uniform cache.

* * * * *